United States Patent [19]

Kuffel

[11] Patent Number: 5,759,004
[45] Date of Patent: Jun. 2, 1998

[54] MLT BENT LEG PUSHMOUNT

[75] Inventor: Gregory L. Kuffel, Shaumburg, Ill.

[73] Assignee: Panduit Corp., Tinley Park, Ill.

[21] Appl. No.: 50,690

[22] Filed: Apr. 20, 1993

[51] Int. Cl.⁶ ........................................ F16B 19/00
[52] U.S. Cl. ........................ 411/508; 24/295; 248/71
[58] Field of Search .................... 411/520, 526, 411/913, 508; 24/453, 295; 248/74.3, 71

[56] References Cited

U.S. PATENT DOCUMENTS

| | | | |
|---|---|---|---|
| 1,959,096 | 5/1934 | Fernberg | 24/295 |
| 2,100,017 | 11/1937 | Van Uum | 248/71 |
| 2,128,005 | 8/1938 | Lombard . | |
| 2,143,603 | 1/1939 | Lombard | 24/453 X |
| 2,397,680 | 4/1946 | Morehouse . | |
| 2,445,481 | 7/1948 | Wertz | 248/74.3 |
| 3,088,702 | 5/1963 | Orenick . | |
| 3,205,546 | 9/1965 | Nelson | 24/295 |
| 3,441,986 | 5/1969 | Pritchard | 24/458 X |
| 3,501,117 | 3/1970 | Soltysik | 248/71 |
| 3,550,219 | 12/1970 | Van Buren, Jr. . | |
| 3,621,751 | 11/1971 | Fiorentino | 411/508 |
| 4,295,618 | 10/1981 | Morota et al. . | |
| 4,356,987 | 11/1982 | Schmid | 24/458 X |
| 4,630,338 | 12/1986 | Osterland et al. | 24/295 X |
| 4,648,735 | 3/1987 | Oddenino . | |
| 4,795,116 | 1/1989 | Kohut et al. . | |
| 5,039,040 | 8/1991 | Idjakiren . | |

FOREIGN PATENT DOCUMENTS 480240 2/1938 United Kingdom ................ 411/508

OTHER PUBLICATIONS

Panduit Catalog Page No. B24.

*Primary Examiner*—Rodney M. Lindsey
*Attorney, Agent, or Firm*—Mark D. Hilliard; Robert A. McCann; Michael J. Turgeon

[57] ABSTRACT

A one-piece mount formed from metal that provides for securing a bundle of wires by a metal cable tie to a mounting surface having a pair of spaced apart retaining legs that are inserted into and secured in a hole in a mounting surface and including a strap accepting channel for engaging an independent cable tie strap at an opposite end.

3 Claims, 3 Drawing Sheets

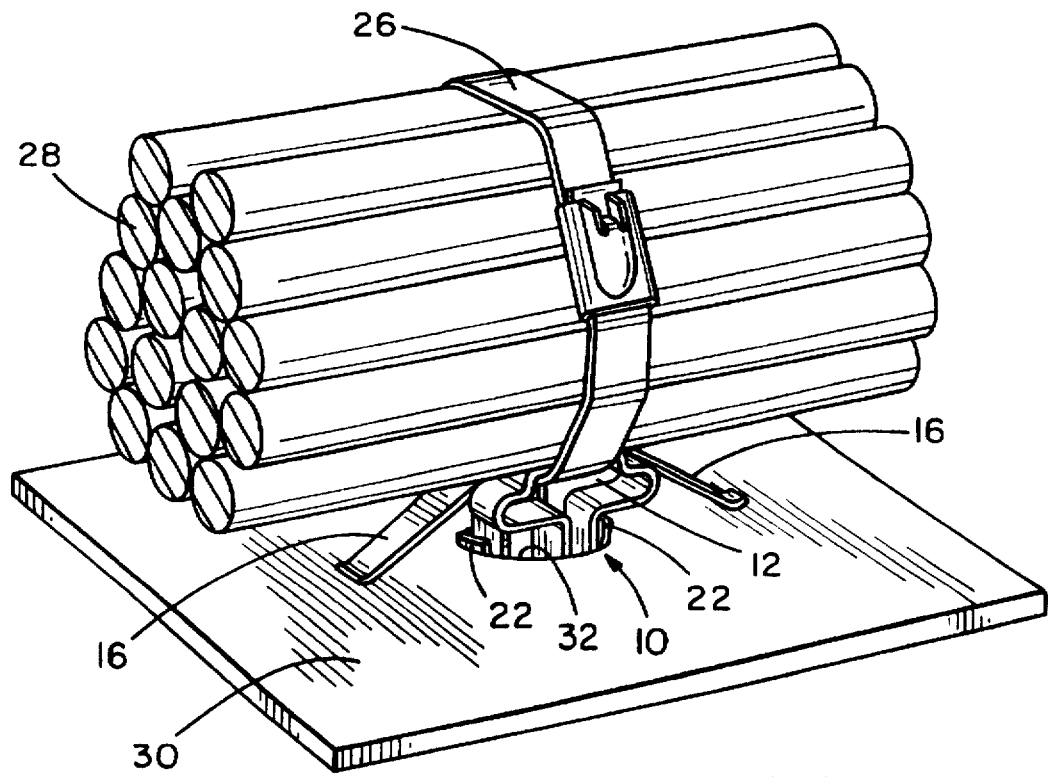
FIG. 1
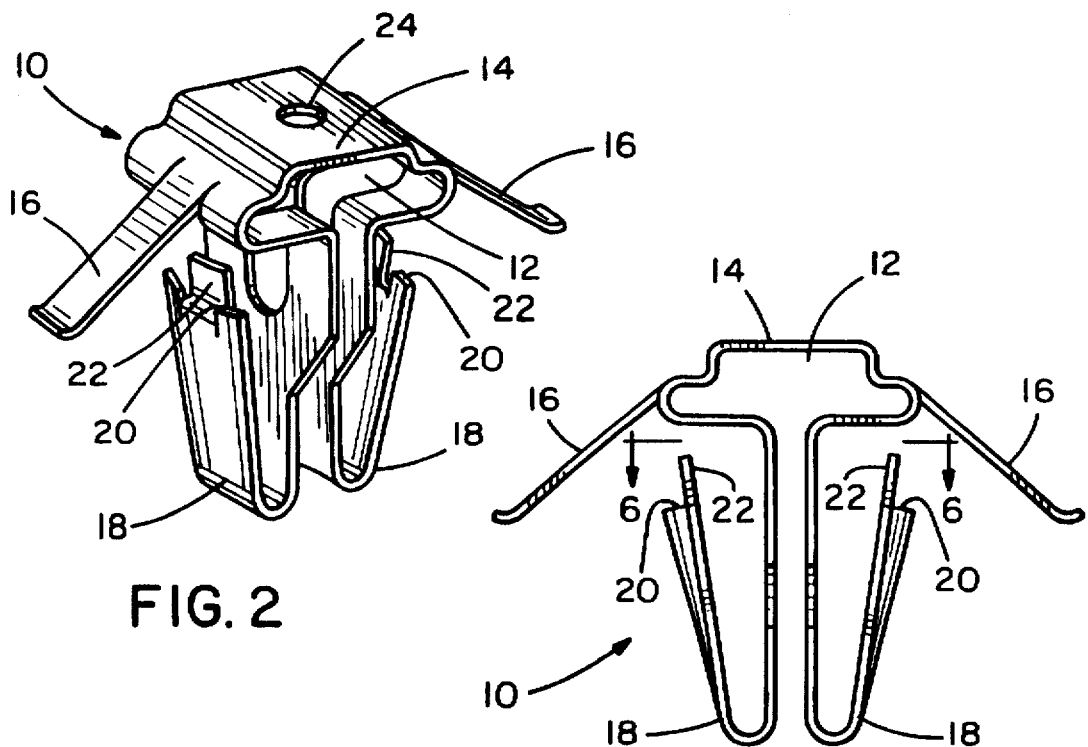
FIG. 2
FIG. 3

MLT BENT LEG PUSHMOUNT

TECHNICAL FIELD

The present invention relates to a cable tie mount and more specifically to a one-piece bent leg pushmount formed from metal that provides for mounting a bundle of wires, that are secured by an independent cable tie, to a mounting surface.

BACKGROUND OF THE INVENTION

Throughout the electrical industry today there are a wide variety of applications for mounts that secure bundles of wires contained by a cable tie to a mounting surface. In many instances the user only has access to one side of the mounting surface, and it is necessary to utilize a mount that can be inserted from one side of the mounting surface into a hole and which provides a cable tie strap engaging support on the accessible side of the mounting surface.

Also in the electrical industry today, there is an increasing use of metal cable ties for securing bundles of wires, and the like. This increase in applications that utilize the particular characteristics and advantages of metal cable ties has resulted in a demand for mounts that are specifically intended for use in connection with the metal cable ties. Many of the previous pushmount designs require an attached integral flexible strap formed as part of the mount, or are otherwise ill-suited for use with metal cable ties.

SUMMARY OF THE INVENTION

It is therefore an object of the present invention to provide a mount that is inserted into a hole from one side of a mounting surface and allows for engagement with an independent cable tie strap on that insertion side of the mounting surface.

It is further an object of the present invention to provide a mount that can be used to mount a bundle of wires that is secured by a metal cable to a mounting surface.

It is another object of the present invention to provide a metal mount which can be used in conjunction with metal cable tie applications that is simple and inexpensive to manufacture.

In general a bent leg pushmount includes a mount member having strap engaging means for allowing engagement with an independent cable tie strap, a pair of spaced apart retaining legs extending from an underside of the strap engaging means for insertion into a hole of a mounting surface and a mount securing means disposed on the retaining legs for securing the mount member to the mounting surface.

BRIEF DESCRIPTION OF THE DRAWINGS

FIG. 1 is a perspective view of a mount embodying the concept of the present invention shown securing a bundle of wires to a mounting surface;

FIG. 2 is a perspective view of a mount embodying the concept of the present invention;

FIG. 3 is a front view of the mount of FIG. 2;

DESCRIPTION OF THE PREFERRED EMBODIMENT

Figure 4:
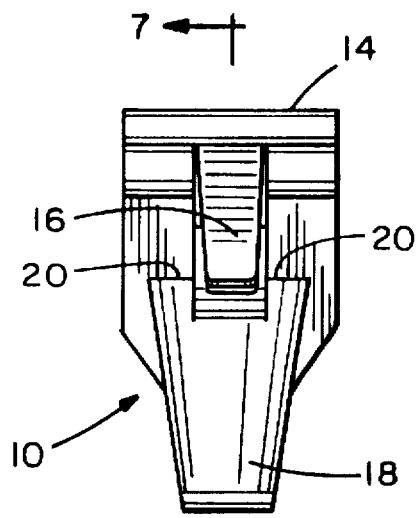
FIG. 4 is a side view of the mount of FIG. 2.
Figure 5:
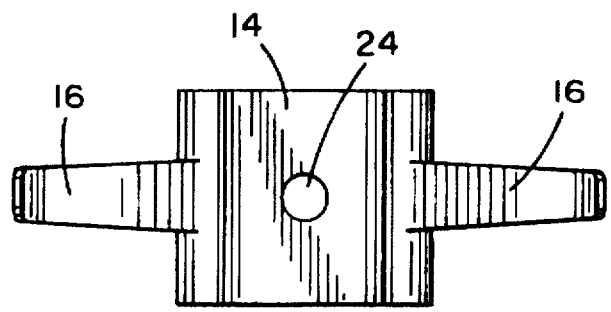
FIG. 5 is a top view of the mount of FIG. 2.
Figure 6:
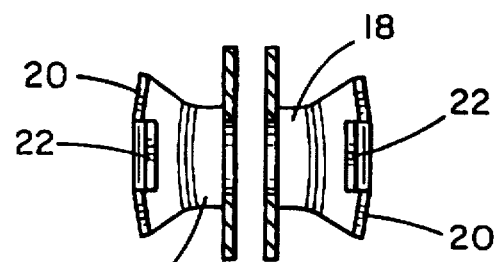
FIG. 6 is a sectional top view of the mount of FIG. 2 taken along line 6—6 of FIG. 3.

A pushmount embodying the concept of the present invention is designated generally by the reference numeral 10 in the accompanying drawings. Mount 10 is formed from sheet metal stamping of a unitary piece of metal such as stainless steel. As shown in FIG. 3, mount 10 has a substantially enclosed strap accepting channel 12 and has a pair of attached spaced apart resilient retaining legs 18 extending from the underside of strap accepting channel 12. Strap accepting channel 12 is generally oblong in shape and wide enough for a cable tie strap 26 to be passed through. Generally, oblong strap accepting channel 12 further includes an offset planar portion 14 on its top side which acts as a slot for cable tie strap 26. Since mount 10 is integrally formed, strap accepting channel 12 is substantially enclosed but for the distance that legs 18 are spaced apart.

Figure 7:
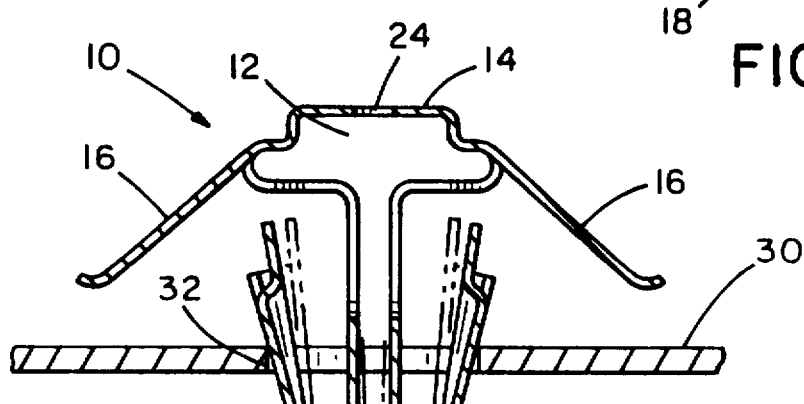
FIG. 7 is a sectional front view of the mount of FIG. 2 taken along line 7—7 of FIG. 4 shown being inserted into a hole in the mounting surface.
Figure 8:
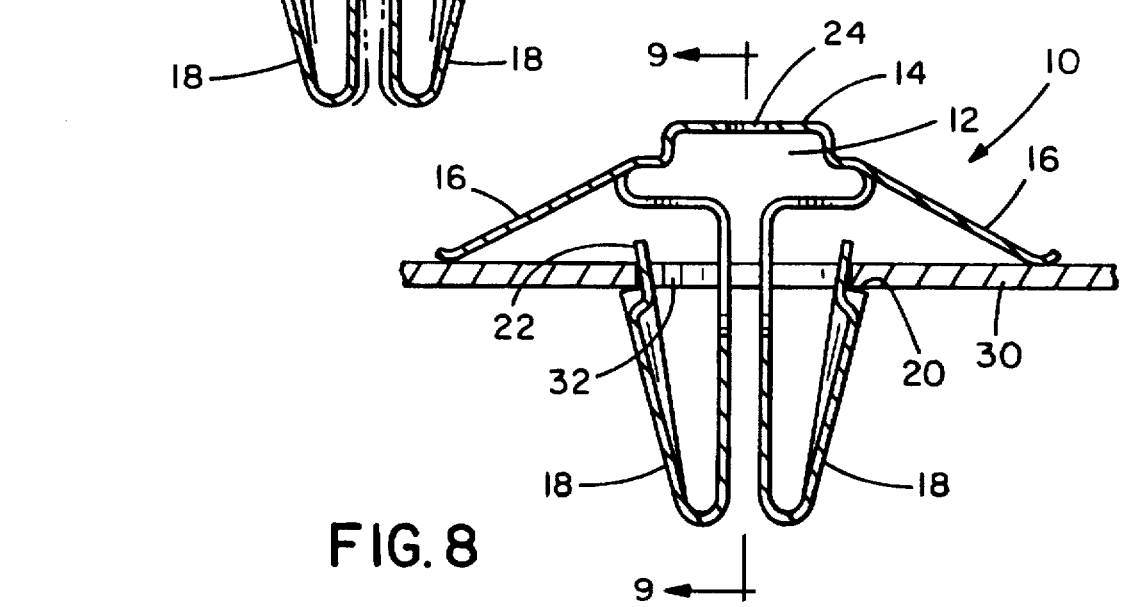
FIG. 8 is a front view of the mount of FIG. 2, shown secured to the mounting surface.
Figure 9:
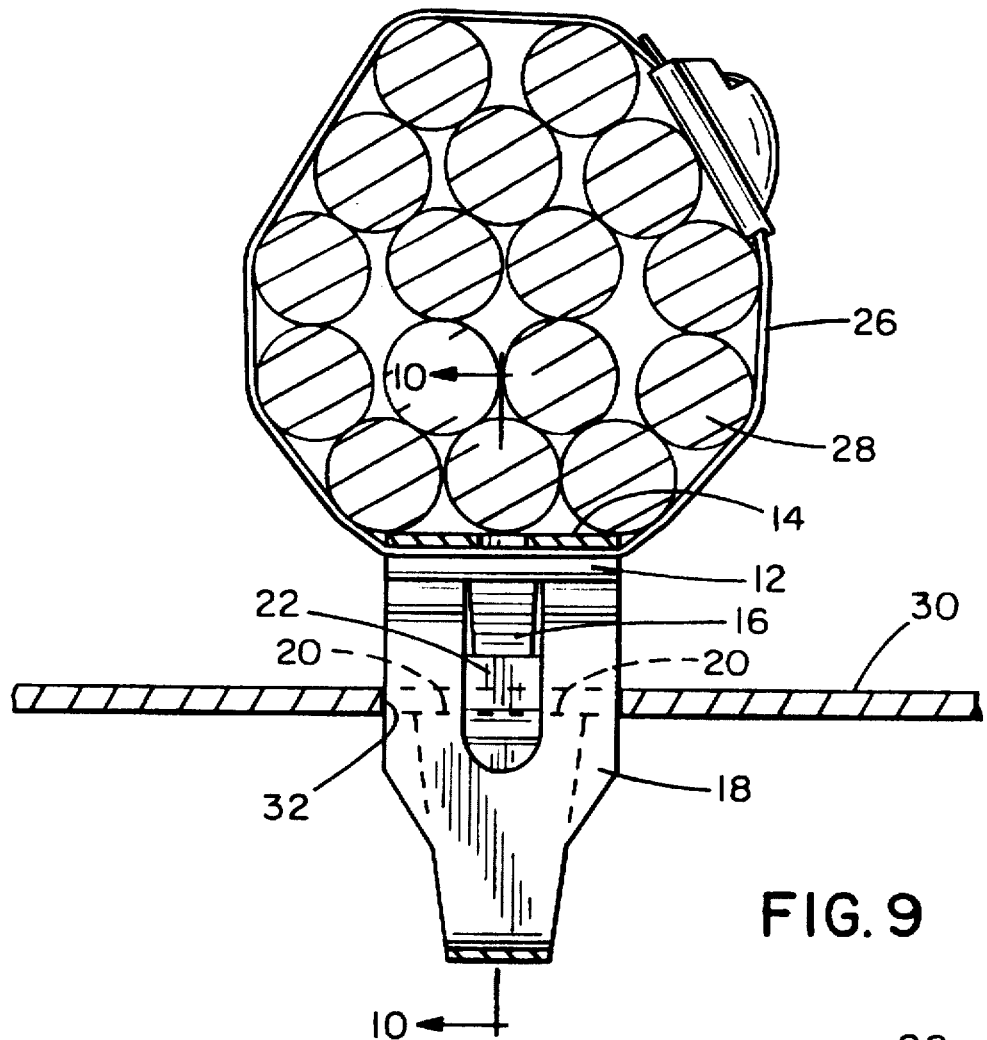
FIG. 9 is a sectional side view of the mount of FIG. 2, taken along line 9—9 of FIG. 8, shown securing a bundle of wires to the mounting surface.
Figure 10:
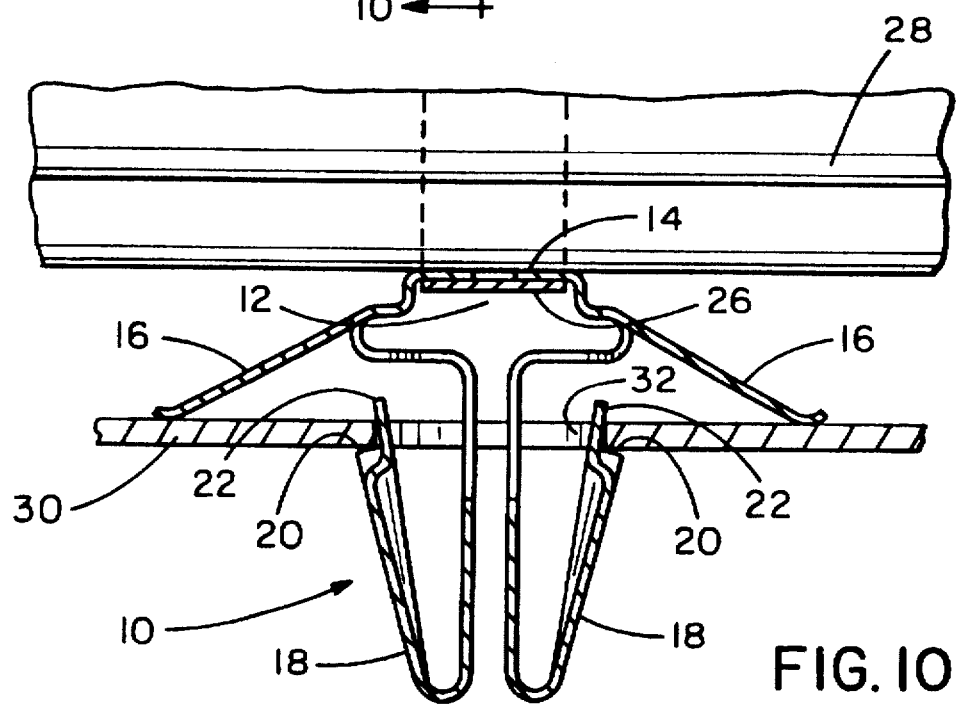
FIG. 10 is a front sectional view of the mount of FIG. 2 taken along line 10—10 of FIG. 9.

Each leg 18 is formed so as to be reversely bent upon itself. Therefore, as legs 18 are inserted into hole 32 of mounting surface 30, both the legs 18 in their entirety and the individual reversely bent portions of legs 18 are flexed inwardly as shown in FIG. 7. As the ends of the reversely bent portions of legs 18 pass completely through hole 32, the spring forces created push them outwardly. Each leg 18 has a centering tab 22 formed as an inwardly offset extension of the reversely bent leg portions. As legs 18 spring outwardly upon passing through hole 32, centering tabs 22 abut against mounting surface 30 from within hole 32. This outward pressure exerted by centering tabs 22 helps to secure and center mount 10 within hole 32. Furthermore, since centering tabs 22 are inwardly offset, the end surfaces 20 of the reversely bent portions of legs 18 abut the underside of mounting surface 30 to retain mount 10 in engagement with mounting surface 30.

With mount 10 secured to mounting surface 30, strap support accepting channel 12 is engageable by cable tie strap 26. Cable tie strap 26 is passed through strap accepting channel 12 and can then be secured around a bundle of wires 28. Mount 10 is also provided with a pair of opposing spring legs 16 extending from sides of strap accepting channel 12. Spring legs 16 extend from the sides of strap accepting channel 12 at a downward angle and for a distance such that the ends of spring legs 16 are at an approximately equal height with the ends of reversely bent portions of legs 18 when the mount 10 is an unmounted position. Spring legs 16 are resilient and when mount 10 is pushed into hole 32, the flattened ends of spring legs 16 press against the upper side of mounting surface 30 in a manner such that end surfaces 20 of legs 18 are forced against the underside of mounting surface 30 to secure mount 10 firmly against mounting surface 30.

Once mount 10 is fixed to mounting surface 30, cable tie strap 26 can be passed through strap accepting channel 12, seated on offset portion 14 and engage bundle of wires 28 or the like. Any size cable tie strap 26 that fits within strap accepting channel 12 may be used. For applications in which the user has access to both sides of mounting surface 30, mount 10 can be released from engagement with mounting surface 30 by pressing together legs 18 until their end surfaces 20 can be passed back through hole 32.

A centering hole 24, shown in FIG. 2, is optionally formed on the top surface of strap accepting channel 12. Centering hole 24 allows for the mount 10 to be held in place and controlled during the manufacturing processes.

While the particular embodiment of the present invention has been shown and described, it will be obvious to those skilled in the art that changes and modifications may be made without departing from the invention in its broader aspects. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A pushmount comprising:

a one-piece folded metal mount member having a formed strap accepting channel;

a pair of spaced apart retaining legs extending from an underside of the strap accepting channel;

said strap accepting channel including an offset planar portion on a top side of the strap accepting channel to seat a cable tie strap;

wherein the strap accepting channel is formed having a generally oblong passageway;

wherein the spaced apart retaining legs are each formed as a resilient reversely bent extension and an end of each reversely bent extension is disposed so as to abut an underside of a mounting surface as the resilient reversely bent extensions of the retaining legs pass through a hole of the mounting surface and flex apart;

wherein the mount member further includes a centering tab formed as an inwardly offset extension on each of the reversely bent extensions of the retaining legs situated so that the outside of each centering tab presses against the hole of the mounting surface after the reversely bent portions pass through the hole of the mounting surface and flex apart wherein the mount member includes a pair of resilient spring legs laterally extending from the sides of the strap accepting channel and situated at a downward angle such that they will abut an upper surface of the mounting surface when the mount is inserted into the hole to further secure the mount member.

2. A pushmount according to claim 1, wherein the spring legs extend downwardly a distance such that ends of the spring legs are at an approximately even height with the ends of the reversely bent extensions of the retaining legs.

3. A pushmount according to claim 2, wherein the mount member is formed of stainless steel.

* * * * *